United States Patent [19]
Peterson

[11] 4,099,034
[45] Jul. 4, 1978

[54] FASTENING ARRANGEMENT IN A TELEPHONE INSTRUMENT OF THE ONE-PIECE TYPE

[75] Inventor: Sven Tage Peterson, Tyresö, Sweden

[73] Assignee: Telefonaktiebolaget L M Ericsson, Stockholm, Sweden

[21] Appl. No.: 782,061

[22] Filed: Mar. 28, 1977

[30] Foreign Application Priority Data

May 4, 1976 [SE] Sweden .............................. 7605076

[51] Int. Cl.[2] .............................................. H04M 1/04
[52] U.S. Cl. .............................. 179/100 R; 179/103; 179/178
[58] Field of Search ............ 179/100 R, 100 D, 100 C, 179/103, 146 R, 147, 178, 179; 220/346, 347

[56] References Cited

U.S. PATENT DOCUMENTS

3,476,886  11/1969  Ferrari et al. ................... 179/100 D

FOREIGN PATENT DOCUMENTS

1,372,895  10/1963  France ................................ 179/103
2,440,899   8/1974  Fed. Rep. of Germany ....... 179/179
2,100,101   1/1971  Fed. Rep. of Germany ....... 179/178

*Primary Examiner*—William C. Cooper
*Assistant Examiner*—Randall P. Myers
*Attorney, Agent, or Firm*—Hane, Roberts, Spiecens & Cohen

[57] ABSTRACT

The invention relates to a fastening arrangement in a telephone instrument of the one-piece type for both the earphone capsule and the cap which cap should be fastened to the casing in order to cover the opening of the head part. The arrangement has two elements. The first element is a body which is secured to the inside of the casing in the top of the head part, and two oppositely directed tongue-formed parts. The first part, directed upwards, engages an upper collar-formed socket on the inside of the instrument cap and the second tongue-formed part contacts the upper front surface of the earphone capsule. The second element is a body with a rear projection engaging an aperture of a printed circuit card mounted inside the throat of the casing and two oppositely directed tongue-formed parts. The first of these parts contacts the lower front surface of the earphone capsule and the second engages a lower collar-formed socket on the inside of the instrument cap. The second element is also provided with two resilient taps directed downwards to engage the inside of the instrument casing.

4 Claims, 9 Drawing Figures

FASTENING ARRANGEMENT IN A TELEPHONE INSTRUMENT OF THE ONE-PIECE TYPE

The present invention relates to a fastening arrangement in a telephone instrument of the one-piece type known under the trademark: "ERICOFON". More specifically, the present invention relates to a fastening arrangement for the earphone capsule and for the cap which is applied to the casing of the set for protecting the earphone capsule simultaneously as the capsule is held.

In telephone sets of the one-piece type, i.e. the instrument set and the hand microphone part forming one unit, it is important that all the components be so placed and mounted that good mechanical stability is obtained. The principle in the mechanical building up of such sets is to manufacture the set and the fastenings resiliently relative to each other and thus be shock absorbing so that if the set is dropped or otherwise subjected to impacts, the included parts will not be damaged. Regarding comparatively big components in the set, for example, the earphone capsule, the risk of damage upon impacts will be greater. Thus, special measures must be taken.

An object of the present invention is to provide a fastening arrangement for the cap and the earphone capsule in a telephone arrangement for a set of the one-piece type which gives a fastening of the cap and a resilient fastening of the earphone capsule, whereby the risk of damage of the parts of the set can be reduced.

The invention, the characteristics of which appear from the appended claims will be fully described with reference to the accompanying drawings in which FIG. 1 is a front view the upper part of a telephone set of the one-piece type with its cap removed in order to illustrate the fastening of the earphone capsule of the set with the fastening arrangement according to the invention;

Figure 1:
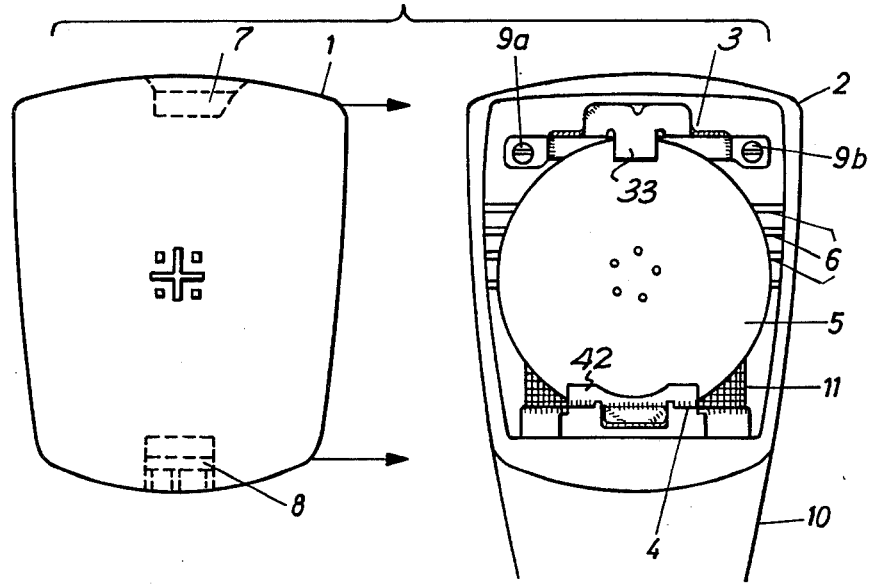

FIG. 1 shows the upper part of a telephone set of the one-piece type with associated cap 1 where the cap is removed so that the attachment of the earphone capsule is apparent. The casing of the set shows a head part 2 which contains the earphone capsule 5. This is laterally fixed by means of transversal ribs 6 which are firmly moulded to the inside of the casing. The fastening arrangement according to the invention has a first fastening element 3 and a second fastening element 4. The fastening element 3 is by means of screws 9a, 9b fixed to elevations (not shown) on the inside of the casing, whereby the fastening element 3 fixes the position of the capsule in relation to the casing. The second fastening element 4 is applied to an opening of a printed circuit card 11 which is mounted inside the throat-shaped part 10 of the set. The cap 1 is on the inside provided with an upper and a lower guiding element 7 and 8, respectively which, when the cap is fastened, by means of a transverse displacement in the direction of the arrows, engages the first and the second fastening element 3, 4, respectively.

Figure 2:
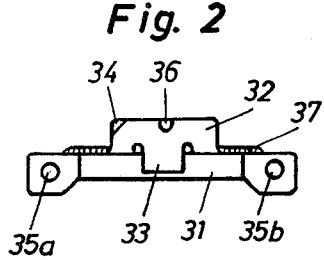
FIG. 2 shows in a front view a first fastening element of the fastening arrangement according to the present invention.
Figure 3:
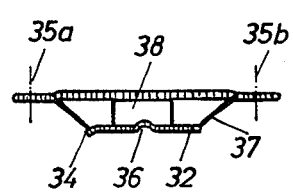
FIG. 3 is a top view of the same fastening element as in FIG. 2 seen from the top.
Figure 4:
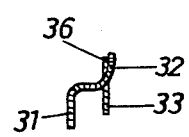
FIG. 4 shows the fastening arrangement according to FIGS. 2 and 3 seen sideways.

FIGS. 2 and 3 show more closely the characteristics of the first fastening element. The mainly plane body 31 has wider ends to give space for holes 35a, 35b in which the screws 9a, 9b are inserted. Protruding part 37 (compare FIG. 3) which extends from body 31 terminates in a bent part which consists of a broad tongue 32 and a narrow tongue 33.

As viewed in FIG. 3 broad tongue 32 has one corner 34 bent. In the middle of the broad tongue there is an abutment 36. The part 37 moreover has a rectangular opening 38. As it appears from FIG. 1, the peripheral surface of the capsule 5, at the attachment, will contact the borders of the rectangular openings 38 of the part 37. Moreover, the tongue 33 closely contacts the front surface of the capsule while, on the contrary, there is a certain clearance between the rear surface of the capsule 5 and the body 31.

Figure 6:
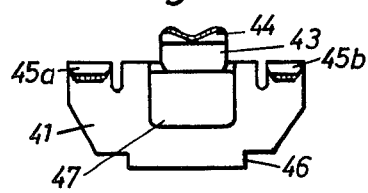
FIG. 6 shows the same fastening element as in FIG. 5 seen from below.
Figure 5:
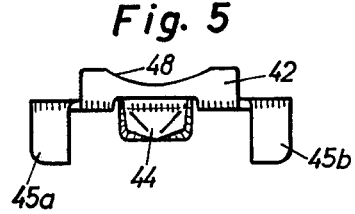
FIG. 5 is a front view a second fastening element of the fastening arrangement according to the invention.
Figure 7:
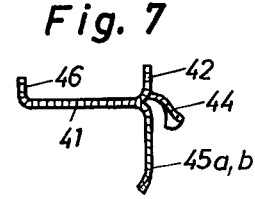
FIG. 7 is a side view of the fastening element according to FIGS. 5 and 6.

FIGS. 5 and 6 show more closely the characteristics of the second fastening element 4. This includes a body 41, the one longitudinal side of which shows a broad tabformed border part 46 which is intended to be pushed into a rectangular opening (not shown) of the printed circuit card 11 arranged in the throat part of the set. The left and the right part of the body 41 each shows a tongue-formed part 45a, 45b which is bent mainly perpendicular to the plane surface of the part 41. The parts 45a, 45b resiliently contact at the fastening towards the inside of the casing as seen in FIG. 1. The middle part of the body 41 is punched so that a rectangular formed opening 47 and so that a tongueformed part 43 are formed which in turn is bent so that a further tongueformed part 44 is obtained. The part 44 is bent to wingform with protruding corners in order to enable a resilient contact of the cap towards the part 44 as shown in FIG. 7. The part 42 according to FIG. 5 contacts at the fastening closely towards the capsule 5 and therefore is punched along a circular arc 48 for clearance of the acoustic sensitive front side of the capsule. The lower peripheral surface of the capsule will contact towards the borders of the opening 47.

As it already appears from FIG. 1, the tongue 33 of the element 3 and the part 42 of the element 4 contacts closely towards the capsule 5. For fastening the cap 1 of the set to the head part 2 of the set, its inside is provided with an upper and a lower guiding element 7 and 8, respectively. These elements will be described with respect to FIGS. 8 and 9, respectively.

Figure 8:
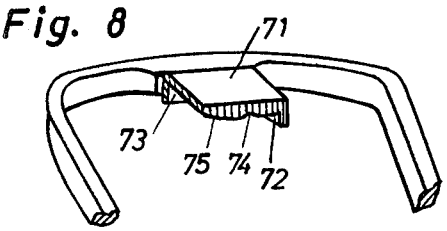
FIGS. 8 and 9 show the upper and the lower part, respectively of the inside of the cap in order to illustrate the fastening of the cap to the set by means of the fastening arrangement according to the invention.

The guiding element 7 according to FIG. 8 is moulded to the inner border of the cap 1 and consists of a planar upper part 71 which by means of two ribs 72 and 73 is raised above the bottom of the cap. Hereby a pocket is formed between the lower surface of the upper part 71 and the bottom of the cap. A slot 74 is cut along the lower surface of the upper part 71 to match the abutment 36. The upper part 71 is provided with a ramp 75 in order to facilitate the pushing-in of the cap 1.

Figure 9:
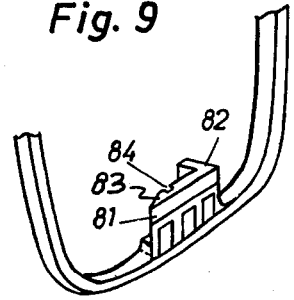

The guiding element 8 according to FIG. 9 is constructed in similar manner as the element 7. The element 8 consists of an upper part 81 which is raised above the bottom of the cap by means of the rib 82. The part 81 shows a slope 83 in order to facilitate the pushing-in of the cap 1. A slot 84 is cut along the lower surface of the part 81 in order to match the peaked middle part of the part 44.

When the cap is to be fastened to the head of the set the slope 73 and 83 of the element 7 and 8, respectively contacts the bent corner parts of the parts 34 and 44 of the element 3 and 4, respectively. With continued pushing-in of the cap in the direction which is indicated by the arrows in FIG. 1, the lower surface of the parts 71 and 81 of the guiding element will slide towards the tongue-formed parts 32 and 44, respectively and at the same time the tongue 33 and the part 42 are bent inwards towards the capsule so that these parts more closely contact the capsule. The cap is by the slope 75 and 83 forced to closely contact the contact surface of the casing.

We claim:

1. In a telephone set of the one-piece type having a housing with an upper front opening, an earphone capsule in the opening and an outer cap for covering the opening wherein the inside of the outer cap is provided with oppositely positioned first and second guiding elements, a fastening arrangement for the earphone capsule and the cap comprising:

a first fastening element having a planar body with a middle part and two end parts, said end parts including means for firmly attaching said planar body to the inside of said housing and a portion of said middle part being shaped as a protruding part, said protruding part having two tongue-formed parts, one of said tongue-formed parts being directed upwards towards the top of the set and having an inner surface in contact with the upper front surface of said earphone capsule, the other tongue-formed part being directed opposite relative to said one tongue-formed part and shaped so as to facilitate the guiding and securing of the first guiding element of the outer cap in the fastened position; and a second fastening element having a planar body with a middle part which is formed with two tongue-formed parts, one of said tongue-formed parts being directed upwards towards the top of the set and having an inner surface in contact with the lower front surface of said earphone capsule, the other of said tongue-formed parts being directed opposite relative to said one tongue-formed part and shaped so as to facilitate the insertion of the second guiding element of the outer cap, and said planar body having two end parts each being shaped as a further tongue-formed part protruding in a direction downwards towards the bottom of the set and resiliently abutting the lower edge of said front opening.

2. Fastening arrangement as claimed in claim 1, wherein one of the tongue-formed parts of said first fastening element has a corner bent in a direction away from its associated planar body.

3. Fastening arrangement as claimed in claim 1, wherein a rectangular opening is disposed in the protruding part of said first fastening element for receiving a portion of the earphone capsule.

4. Fastening arrangement as claimed in claim 1, wherein one of the tongue-formed parts of said second fastening element has two corners bent in a direction away from its associated planar body.

* * * * *